June 27, 1933. B. LONG ET AL 1,916,174
TEMPERED GLASS SHEET AND METHOD OF PRODUCING THE SAME
Filed March 8, 1930
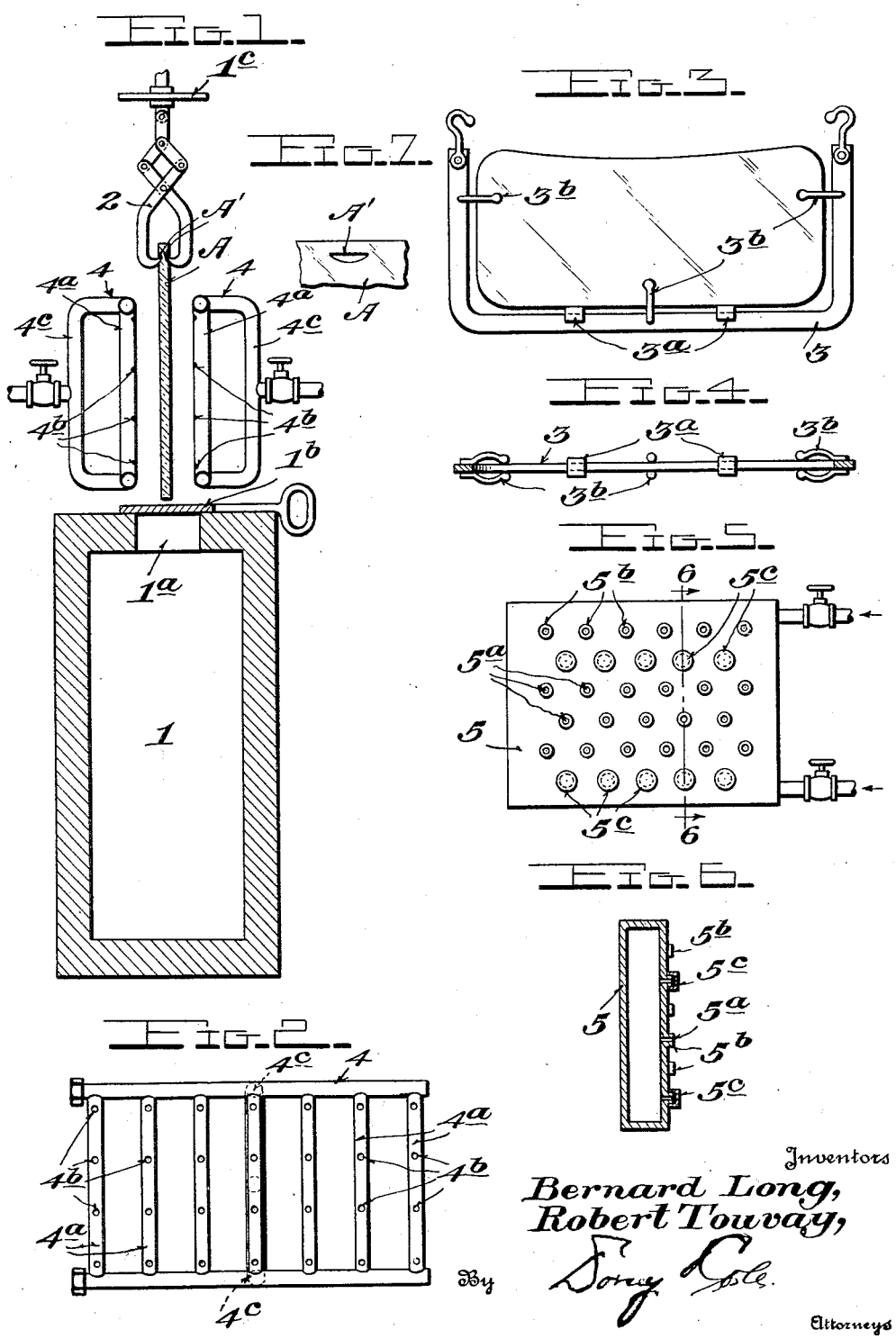
Inventors
*Bernard Long,
Robert Touvay,*
By
Attorneys Patented June 27, 1933

1,916,174

UNITED STATES PATENT OFFICE

BERNARD LONG, OF PARIS, AND ROBERT TOUVAY, OF CIREY-SUR-VEZOUZE, FRANCE, ASSIGNORS, BY MESNE ASSIGNMENTS, TO THE AMERICAN SECURIT COMPANY, A CORPORATION OF DELAWARE

TEMPERED GLASS SHEET AND METHOD OF PRODUCING THE SAME

Application filed March 8, 1930, Serial No. 434,263, and in France March 13, 1929.

This invention has for its object to provide a sheet of glass suitable for glazing in windows, and particularly as a windshield for automobiles, in that it is so tempered that on fracture, instead of breaking into large pieces, liable to inflict great injury or even death, it will shatter into innumerable fragments, each small, whereby the chance of serious injury is reduced; the tempering at the same time tending to increase the mechanical strength of the glass. The invention has for its further object to provide means and a method by which the desired tempering may be cheaply and efficiently accomplished.

The article to be produced is a sheet of glass generally flat having highly polished surfaces so tempered that the surface skins are under compression, and the interior under tension, whereby on rupture of the skin, the sheet will shatter.

To accomplish this result, we propose to suddenly cool at selected points, the surface of sheets which have a temperature corresponding to that of the commencement of the softening of the glass, which for ordinary window glass will be in the neighborhood of 550° to 620° C., in such a manner as not to impair the surface of the sheets or to unduly warp them. The first is important, because to regrind or repolish the sheets after tempering might result in unbalancing of the surface strains, with the resultant shattering of the glass during polishing, or the breaking of the glass in use into fragments of unequal size. This would be the more liable to happen if the glass had warped even to the slightest degree. The methods heretofore employed for the tempering have either impaired the surface or caused warping, or both.

In carrying out our invention we prefer to uniformly heat the glass forming the sheet to a temperature corresponding to the beginning of softening and to submit it to the tempering operation, immediately after the glass has been uniformly heated.

For the purpose of heating and tempering the glass, we prefer to employ some form of furnace in which the glass can be "soaked" until it has reached a uniform temperature throughout its thickness, and a cooling device so located and so constructed that the sheet can be subjected to the tempering operation immediately it is withdrawn therefrom. The sheets should be carefully protected against warping while being heated, and during the tempering. This may be accomplished either by suspending them in a vertical plane during these operations, or supporting them vertically in suitable beds during such times. The cooling means may take the form of air jets directed on selected points of the heated sheet.

Referring to the accompanying drawing, representing different embodiments of apparatus for carrying out this invention,—

Figure 1 is a diagrammatic view of a heating and tempering means.

Figure 2 is an elevation of the cooling device of Figure 1.

Figures 3 and 4 are an elevation and a plan respectively, of a plate-carrying mechanism that can be used in lieu of that shown in Figure 1.

Figures 5 and 6 are an elevation and a section through a cooling device that may be used in lieu of that shown in Figure 2.

Figure 7 shows the upper edge of the glass sheet at the place where it is suspended.

In Figure 1 we have shown a simple form of our invention in which 1 is a heating chamber, in which the sheet A may be suspended from near its upper edge by tongs 2, the points of the tongs engaging notches $A^1$, cut in the sheet near its upper edge, as shown in Figure 7. Obviously, the chamber may be of any approved type, both in respect to the means of heating it and the means feeding the sheet or sheets thereto and therefrom. In lieu of supporting the sheet as above described, by tongs, it may be supported as shown in Figures 3 and 4, in a frame 3, by blocks $3^a$, it being held in place in the frame by cleats $3^b$. With such a form of support, care must be exercised not to heat the sheet to a temperature at which it will buckle.

As shown in Figures 1 and 2, the tempering means consists of a vertical grid 4 of perforated pipes $4^a$, located on each side of the position assumed by the plate immediately upon its withdrawal from the soaking furnace, i. e., immediately over the opening 1ª in the furnace through which the sheet is withdrawn. This opening is preferably provided with a shutter 1ᵇ, another shutter 1ᶜ being fixed over the tongs 2. The grid is supplied with cold compressed air by means of the piping connections 4ᶜ, the construction and arrangement of these connections 4ᶜ, and the number and location of the perforations 4ᵇ in the grids being such that the distribution of strain in the sheet produced by the local cooling of the jets, is in accordance with that which will give the desired "burst" of the sheet. The location of the grids on opposite sides of the sheets equalizes the tempering of the two surfaces, and hence prevents warping. It also increases the strain existing in the sheet.

In Figures 5 and 6 we have shown a modified form of tempering mechanism consisting of a flat air chest 5 having perforations 5ª on one side. By preference, the perforations are formed in bosses 5ᵇ projecting from the surface of the box, and covers 5ᶜ are provided whereby selected perforations may be closed to effect the desired distribution of strain.

Having thus described our invention what we claim as new and desire to secure by United States Letters Patent, is:

1. A glass sheet having its interior under tension at selected points thereon, the points of tension being symmetrically arranged.

2. A windshield consisting of sheet glass having its interior under tension at selected points thereon, the points of tension being symmetrically arranged.

3. The hereinbefore described method of tempering glass sheets which comprises uniformly heating the sheet to a temperature corresponding to that of the commencement of the softening of the glass and immediately subjecting the sheet while in a vertical position to cooling by air jets directed on the surface of the sheet at points thereon selected in accordance with the desired breaking pattern of the glass.

4. The hereinbefore described method of tempering glass sheets which comprises uniformly heating the sheet to a temperature corresponding to that of the commencement of the softening of the glass and immediately locally chilling the glass at points selected in accordance with the desired breaking pattern of the glass.

5. The hereinbefore described method of tempering glass sheets, which comprises uniformly heating the sheet to a temperature corresponding to that of the commencement of the softening of the glass and immediately subjecting the sheet while in a vertical position to cooling by air jets directed on the opposite faces of the sheet, the arrangement of jets on the opposite faces being symmetrical.

6. The hereinbefore described method of tempering glass sheets, which comprises uniformly heating the sheet to a temperature corresponding to that of the commencement of the softening of the glass and immediately subjecting the sheet while in a vertical position to cooling by air jets directed on the surface of the sheet and normal thereto.

7. The hereinbefore described method of tempering glass sheets, which comprises uniformly heating the sheet to a temperature corresponding to that of the commencement of the softening of the glass and immediately subjecting the sheet while in a vertical position to cooling by air jets directed on the opposite faces of the sheet and normal thereto, the arrangement of jets on the opposite faces of the sheet being symmetrical.

8. The hereinbefore described method of tempering glass sheets which comprises uniformly heating the sheet to a temperature corresponding to that of the commencement of the softening of the glass and immediately subjecting the sheet while in a vertical position to cooling by a plurality of separate air jets simultaneously directed on the opposite faces of the sheet throughout the area thereof, the arrangement of the jets on the opposite faces being symmetrical with each other.

9. The hereinbefore described method of tempering glass sheets which comprises uniformly heating the sheet to a temperature corresponding to that of the commencement of the softening of the glass and immediately subjecting the opposite faces of the sheet while in a vertical position to equal cooling by a plurality of air jets simultaneously directed on the opposite faces of the sheet, the arrangement of jets on the opposite faces being symmetrical with each other.

10. A glass sheet having points of compression upon its exterior surface, such points on the two surfaces being opposite to and symmetrical with each other.

In testimony whereof we hereunto affix our signatures.

BERNARD LONG.
ROBERT TOUVAY.